United States Patent [19]

Glass et al.

[11] Patent Number: 5,102,680
[45] Date of Patent: Apr. 7, 1992

[54] REDUCED FAT READY-TO-SPREAD FROSTING

[75] Inventors: Brian E. Glass, Brooklyn Park; Maeve C. Murphy, New Hope, both of Minn.; Nancy Santori, Scottsdale, Ariz.

[73] Assignee: General Mills, Inc., Minneapolis, Minn.

[21] Appl. No.: 685,794

[22] Filed: Apr. 16, 1991

[51] Int. Cl.$^5$ .................... A23G 3/00; A23L 1/054
[52] U.S. Cl. .................... 426/572; 426/613; 426/659; 426/804; 426/653; 426/602; 426/604
[58] Field of Search ............ 426/613, 572, 659, 804, 426/607, 602, 549, 653, 604

[56] References Cited

U.S. PATENT DOCUMENTS

| | | | |
|---|---|---|---|
| 3,194,666 | 7/1965 | Bedenk et al. | 426/572 |
| 3,253,928 | 5/1966 | Bedenk et al. | 426/572 |
| 3,464,830 | 9/1969 | Wahba | 426/572 |
| 3,592,663 | 7/1971 | Brunner et al. | 426/659 |
| 3,649,302 | 3/1972 | Daggy et al. | 426/659 |
| 3,656,971 | 4/1972 | Reimer | 426/659 |
| 3,671,459 | 6/1972 | Norris | 426/659 |
| 4,037,000 | 7/1977 | Burge et al. | 426/572 |
| 4,135,005 | 1/1979 | Cheng | 426/659 |
| 4,232,049 | 11/1980 | Blake | 426/572 |
| 4,379,176 | 4/1982 | Scherwitz et al. | 426/63 |
| 4,415,601 | 11/1984 | Eckel | 426/659 |
| 4,431,682 | 2/1984 | Smith et al. | 426/572 |
| 4,564,529 | 1/1986 | Watson et al. | 426/659 |
| 4,670,272 | 6/1987 | Chen et al. | 426/659 |
| 4,711,788 | 12/1987 | Porcello et al. | 426/613 |
| 4,753,812 | 6/1988 | Wilson et al. | 426/613 |
| 4,761,292 | 8/1988 | Augustine et al. | 426/572 |
| 4,826,696 | 5/1989 | Wilson et al. | 426/613 |
| 4,834,991 | 5/1989 | Porcello et al. | 426/613 |
| 4,865,859 | 9/1989 | Porcello | 426/613 |
| 4,919,947 | 4/1990 | Barry et al. | 426/572 |
| 4,925,694 | 5/1990 | Barry et al. | 426/659 |

*Primary Examiner*—Jeanette Hunter
*Attorney, Agent, or Firm*—John A. O'Toole

[57] ABSTRACT

A reduced fat ready-to-spread frosting composition comprises a sweetening agent; reduced levels of a defined triglyceride high solids index shortening; high levels of particular emulsifiers; about 0.1 to 1.0 wt % of a selected high strength gelling agent; and elevated moisture levels. The shortening system is characterized by a high solid fat index. The frosting composition has a density of about 0.95-1.20 g/cc, contains less than about 6% total fat, and is further characterized in that the weight ratio of triglyceride to emulsifier is about 1:0.3-0.5.

21 Claims, No Drawings

REDUCED FAT READY-TO-SPREAD FROSTING

FIELD OF THE INVENTION

The present invention relates to food products. More particularly, the present invention relates to ready-to-spread frosting compositions and, specifically, reduced fat ready-to-spread frosting compositions.

BACKGROUND OF THE INVENTION

"Icing" or "frosting" are the terms conventionally applied to a wide variety of spreadable, semisolid confectionery products that are used as toppings to sweeten or decorate baked goods such as cakes, breads, cookies, and the like. Such toppings can be categorized into several basic types, such as royal icings, cream icings, aerated creamy frostings, fluffy frostings, and ready-to-spread frostings.

Icings, e.g., "royal" icings, typically refer to compositions containing primarily sugar and water, and optionally, adjuvants such as emulsifiers to enhance storage stability. As an important characteristic, these compositions generally harden to form firm, nonsticky toppings. Usually, such icings do not contain fat; however, a quick-hardening icing containing 3.3 to 5.9 wt % of a high melting point fat has been disclosed (see U.S. Pat. No. 4,415,601 issued to J. A. Eckel). Also, a heat stabilized icing containing up to about 4% of a high melting point fat, up to about 0.5% of an emulsifier, and up to about 0.1% of a gelling system of xanthan and locust bean gums has been disclosed (see U.S. Pat. No. 4,135,005 issued to H. Cheng). The latter formulation could be referred to as a "cream" or "butter-cream" icing, however, the composition is not aerated.

Cream or butter-cream icing compositions typically refer to compositions containing 40 to 80 wt % sugar, 7 to 21 wt % water, 10 to 20 wt % shortening, and optionally, emulsifiers or other bodying agents. These compositions are usually aerated by the consumer by whipping, upon which the density decreases from about 1.3 g/cc to about 1.1 g/cc. Such icings exhibit a rich and creamy mouth feel due, at least in part, to the high levels of shortening employed. The fats and shortenings commonly used for such icings include butter, margarine, and the partially hydrogenated fats and oils.

"Fluffy frostings" are uncooked, highly aerated, (e.g., <0.8 g/cc) sugary compositions, which are generally shortening-free, or at least very low in fat which typically comes from aerating emulsifiers. Fluffy frostings are typically prepared by the consumer from a dry mix by adding hot water to dissolve the sugar and whipping to form the final fluffy products. The dry mixes generally comprise high levels of sugar and further contain a foaming/aerating agent, such as egg albumin, gelatins, enzymatically degraded soy whipping proteins, or an aerating emulsifier, especially polyglycerol esters of fatty acids. Optionally, the dry mixes can contain very low levels of a wide variety of foam stabilizers, such as sodium alginate, gelatin, or a cellulose derivative, such as carboxymethylcellulose. Fluffy frostings have a unique and desirable mouth feel and eating quality because of their high levels of aeration. However, fluffy frostings are not shelf stable and thus not suitable for use as an RTS frosting.

Ready-to-spread ("RTS") frostings are a popular food product due to the convenience provided by fully prepared products. RTS frostings are thus formulated so as to be usable without the addition of ingredients by the consumer. RTS frostings are stored unopened at room temperature for longer times (a one year shelf life target is typical) or stored after opening at refrigerator temperatures for shorter times. RTS frostings are applied directly from the container to a cake or other baked good without mixing or any other manipulative techniques. RTS frostings form a discrete category of frostings because of their extended shelf lives. Formulation of a low fat, good bodied frosting is relatively simple. However, to formulate a reduced fat, high quality frosting of an RTS type and which maintains its desirable features for a shelf life of over one year is a task so daunting as to heretofore been thought impossible.

The primary ingredient in RTS frostings is sucrose, which contributes not only to sweetness, but also to texture and spreadability. Importantly, RTS frostings additionally comprise elevated fat levels compared to the present products resulting from the high shortening levels and modestly from the low level of emulsifier. Both the fat components, i.e., the shortening and the emulsifier, strongly affect the frosting's texture and spreadability attributes and the ability of the packaged formulation to maintain its qualities for extended shelf lives. RTS frostings typically have a higher fat content, a higher water content, are less aerated, and have a thicker consistency than fluffy frostings. A conventional RTS frosting of the "butter-cream" type can have a composition of about 10 to 20 wt % fat, 7 to 21 wt % water, and 40 to 80 wt % sugar (see, for example, U.S. Pat. No. 3,464,830 issued to I. J. Wahba). RTS frostings usually have about 3.8–4.5 calories per gram, and a density of about 0.95–1.20 g/cc.

Various formulations for ready-to-spread or ready-to-use icings or frostings have been developed in attempts to yield frostings that would match the organoleptic properties of bakery or scratch recipe type cream icings or butter-cream frostings, and that would remain spreadable upon storage in a sealed container for up to about one year. The desired organoleptic and performance properties include a smooth texture, a "short" consistency, spreadability without flowing or running, resistance to syneresis or weeping, and a density of about 0.95–1.20 g/cc. To obtain these desirable properties, conventional RTS frosting formulations often include high levels (i.e., 5 to 30 wt %) of shortening or butter. Other formulations have included additives such as pectin, which acts to prevent syneresis upon storage. Another formulation has used a high fructose corn syrup with a starch to provide the desired body (see U.S. Pat. No. 4,761,292 issued to M. E. Augustine et al.). A composition characterized as a "ready-to-use icing" uses certain selected combinations of triglyceride hardstocks in a shortening component to enhance the aeration, storage stability, and nonfirming characteristics of the product (see, for example, U.S. Pat. Nos. 3,194,666 and 3,253,928, both issued to W. T. Bedenk et al.). Still others have used combinations of glyceridic oils, highly hydrogenated vegetable oils, emulsifiers, gelling agents and/or starches (see, for example, U.S. Pat. No. 3,649,302 issued to E. E. Daggy et al. and U.S. Pat. No. 3,464,830 issued to I. J. Wahba).

While popular, RTS frostings are perceived to be indulgence foods that are high in both fat and calories. Thus, it would be desirable to formulate RTS frosting compositions having the familiar and desirable organoleptic and physical properties of conventional RTS frostings but which also are improved by having reduced levels of fats and calories. Moreover, formulation of dry mixes for reduced fat frostings to be prepared by the consumer is relatively inconvenient. However it is immeasurably more difficult to formulate a ready-to-spread frosting which in addition to being low fat and organoleptically desirable also exhibits extended shelf stability.

Recent attempts to make low fat frostings of the butter-cream type have involved the increased addition of water and the elimination and/or reduction in total fat. Such attempts, however, have typically yielded frostings that are undesirably softer, stickier, and that have a consistency similar to marshmallow cream. Both icings and fluffy frostings can be formulated to be low fat, but such reduced fat compositions generally lack the smooth, creamy texture of high fat butter-cream frostings as well as the ability to retain a spreadable consistency during storage.

In particular, one particular fat-free frosting formulation has the rich mouth feel of a cream frosting and the light texture of a fluffy frosting. However, this formulation contains a comestible base prepared by cooking a blend of citrus juice vesicles, sweetening agents, an ungelatinized starch, and an edible organic acid (see U.S. Pat. No. 4,232,049 issued to J. R. Blake et al.). Reduced fat RTS frostings with the appropriate texture and mouth feel are very difficult to obtain, particularly if less than about 6% fat is desired.

In view of the state of the art, there is a continuing need for RTS frostings that substantially retain the flavor and texture of standard creamy-type, i.e., butter-cream, RTS frostings but which nonetheless have reduced levels of fat and calories. That is, a need exists for a topping that combines the creamy, rich mouth feel of cream icings with a low fat content in a convenient ready-to-spread composition. Moreover, there is a continuing need for such high quality but low fat and calorie frostings which can maintain their desirable properties for the extended shelf lives required for RTS frostings.

Surprisingly, the present invention provides reduced fat and calorie RTS frostings which nonetheless have organoleptic and textural attributes comparable to conventional high fat, high calorie frostings.

SUMMARY OF THE INVENTION

In its product aspect, the present invention resides in a reduced fat, ready-to-spread ("RTS"), shelf stable frosting composition having a density of about 0.95-1.20 g/cc and that is at least about 94% fat free. The frostings thus achieve at least about a 50% reduction in the amount of total fat found in conventional RTS frostings. The frostings of the present invention also achieve at least about a 10% reduction in total calories.

It has been surprisingly discovered that the reduced fat, creamy, shelf stable frosting having the characteristics of RTS type frostings can be obtained by formulating the frosting to essentially include A) a sweetening agent, B) low levels of a high SFI triglyceridic shortening system, C) high levels of an emulsifier system, D) a selected gelling agent, and E) higher water contents.

The sweetening component comprises about 65 to 75%. The sweetening component comprises a nutritive carbohydrate sweetener such as sucrose.

The shortening component comprises a partially hydrogenated triglyceride shortening such as cottonseed oil, soybean oil, or a mixture thereof. The shortening can be admixed with all or a portion of an emulsifier. The shortening has a high percentage of solids. The shortening and emulsifiers of the shortening system can be added to the frosting compositions separately or in various combinations.

The emulsifier component can contain any of a variety of commercially available emulsifiers, such as mono- and diglycerides, ethoxylated mono- and diglycerides, polyglycerol esters, sucrose esters, fatty acids and the like. The emulsifier component can be added in various forms, such as in the form of a spray dried emulsifier powder, i.e., a spray-dried emulsifier powder containing corn syrup solids and a small amount of a vegetable shortening.

The total amount of the emulsifier component essentially ranges from about 0.5% to about 3%. The weight ratio of total triglycerides, i.e., shortening to emulsifiers, i.e., emulsifier component is markedly higher than for full fat RTS frostings and essentially ranges from about 1:0.3–0.5.

The selected high strength gelling agent(s) essentially comprise about 0.1 to 1.0% of the present RTS frostings. The gelling agents are selected from the group consisting of gelling polysaccharides, high bloom strength gelatin, high gel strength cold water swelling or gelatinated starches and mixtures thereof.

The present reduced fat RTS frostings essentially comprise about 8 to 25% moisture.

DETAILED DESCRIPTION OF THE INVENTION

In its product aspect the present invention provides a reduced fat, low calorie RTS, storage stable frosting for baked goods such as cakes, cookies, donuts, muffins, and the like. The frostings of the present invention are at least about 94% fat free. The frostings also achieve at least about a 50% reduction in the amount of total fat found in conventional RTS frostings, which can comprise about 10 to 30% total fat. The frostings of the present invention also achieve at least about a 10% reduction in total calories without a significant deleterious effect on taste, consistency, or texture, e.g., mouth feel and spreadability. Most importantly, the present RTS frostings provide the benefit of retaining their spreadable consistency over a shelf life of at least one year.

Throughout the specification and claims all percentages used herein are in weight percentages, and are based on the total weight of the RTS frosting composition, and temperatures in degrees Fahrenheit unless otherwise indicated.

A. Sweetening Agents

A nutritive carbohydrate sweetening agent or "sugar(s)" is the principal essential ingredient in the present RTS frosting composition. The sugar provides bulk and body to the frosting and contributes to the organoleptic properties of the frosting, such as sweetness, texture, consistency, viscosity, density, and taste.

Useful as the "sugar," ingredient herein are any of a variety of edible oligosaccharides having one, two, or more saccharide groups including for example, sucrose, fructose, dextrose, maltose, lactose, galactose, sorbitol, and mixtures thereof. These sugars can be used in any of a variety of conventional forms, such as, for example, cane sugar, beet sugar, corn syrup, corn syrup solids, brown sugar, maple sugar, maple syrup, honey, molasses, and invert sugar. Preferably, the present sweetening agent is selected from the group consisting of sucrose, fructose, dextrose, maltose, and mixtures thereof. More preferably, the sweetening agent is a mixture of sucrose and corn syrup, which generally is a mixture of dextrins, maltose, fructose and dextrose. Most preferably, the sweetening agent is comminuted sucrose.

Various particle sizes are commonly available for sucrose, known in the trade as 6x, 10x, and 12x. The 12x ground sucrose, i.e., powdered sugar, is preferred in the reduced fat RTS frostings of the present invention. Typically, finely divided sugars are combined with a small amount, less than about 6%, of a processing agent, i.e., a "free flow" agent, such as wheat starch for advantageous conveyance in a commercial process.

The total level of sweetening agents in the composition is adjusted within the present concentration ranges such that the appropriate sweetness level and suitable organoleptic properties are obtained for a storage stable ready-to-spread frosting. Suitable organoleptic properties of RTS frostings are very similar to those of aerated cream icings or butter-cream frostings, i.e., smooth texture, short consistency, spreadability without flowing or running, and a density of about 0.95-1.20 g/cc. The total level of sweetening agents in the present RTS frosting composition essentially ranges from about 30 to 85%, preferably about 50 to 80%, For best results in terms of reduced fat content and calories balanced with the desired product qualities, the present RTS frostings desirably comprise about 65 to 75% of the sweetening agent.

In more preferred embodiments, the sweetening agent herein comprises a blend of sucrose and corn syrup which also functions as a plasticizer and humectant. In these preferred embodiments, sucrose (including up to 6% wheat starch based upon the weight of sucrose) essentially comprises about 50 to 80% of the product, and more preferably about 65 to 75%. The corn syrup is present in an amount such that the spreadability and flowability of the frostings are enhanced, and maintained for a longer period of time, relative to conventional bakery frostings. Corn syrup preferably ranges from about 2 to 15% of the frosting compositions.

The sweetness of corn syrups is reported in dextrose equivalents ("DE"), with a higher number representative of a sweeter material. For example, a common corn syrup is a 42 DE corn syrup, available from A. E. Staley Co., Inc., which is moderately sweet, contains about 80% solids and is most preferred for use herein.

Corn syrups, however, can be isomerized to form high DE corn syrups, i.e., with a DE level of about 60-90 DE, which are used to make high-fructose corn syrups, which are blends of fructose and glucose. Pure fructose or high-fructose corn syrups containing about 42 to 55% fructose can be used as the sweetening agent in the present frosting formulations, preferably in combination with sucrose. Typically, the more fructose in the composition, however, the more gelling agent within the ranges specified herein is required to optimize the spreadability and flowability of the frostings or otherwise compensate for the increased flowability resulting from high corn syrup levels. Fructose can be present in the present frosting compositions at about 0.1 to 20%, preferably about 2 to 10%.

Fructose tends to lower the water activity ("$A_w$") of the present RTS frostings. Water activity is, of course, a measure of the amount of chemically available water, i.e., that which is not bound. The lower the water activity of a frosting, i.e., the lower the amount of "free" water, the less likely it is to dry out and harden. Furthermore, with a lower water activity solid particulates can be used, such as chips, without degrading the particulates. Also, the lower the water activity, the less the microbial growth, which results in the reduction or elimination of preservatives. As the amount of fructose increases, the water activity decreases. The water activity of the frosting compositions of the present invention that do not contain fructose is typically about 0.8, with a range of about 0.75 to 0.82.

B. Shortening

The present reduced fat RTS frostings further essentially comprise reduced levels of a particular triglyceridic shortening. The present reduced fat RTS frosting compositions utilize various novel formulation techniques in place of high levels of shortening to produce desirable organoleptic properties. The present compositions use a unique shortening having a higher solid fat index ("SFI") than conventional RTS frosting shortening components. The present frosting compositions also comprise a novel high strength gelling system, an increased water level, and optionally, other fat replacers. In this way, the present RTS compositions contain less than about 6% fat, and less than about 3.8 calories per gram. In contrast, full fat RTS frostings range from about 4.2 to 5 cal/g.

The term "fat" herein is meant to include any fatty, glyceridic material herein and includes both the shortening and emulsifier components as well as the fatty contribution of any other frosting ingredient (e.g., the carrier for a fat soluble flavor).

The term "emulsified shortening" is used herein to encompass the shortening component and the emulsifier component of the frosting compositions. The use of this term is not meant, however, to indicate that the emulsifiers are necessarily combined with the shortening prior to addition to the frosting composition, although such preblending is preferred for a portion of the emulsifiers as described in more detail below.

The present RTS frosting compositions further essentially comprise a particular high SFI triglyceridic shortening, i.e., a partially hydrogenated triglyceride shortening, which is the major contributor to the "fat" content in the reduced fat RTS frosting compositions. The shortening preferably has a melting point of between about 115° and 130° F. (46.1°-55.5° C.), preferably between about 120° to 126° F. (49° to 52° C.). In more preferred embodiments the shortening is further characterized as being hardened or partially hydrogenized and having an iodine value of about 55-75, and preferably about 61-69. In general, the lower the I.V., the greater the solids content.

The partially hydrogenated triglyceride shortening, can be made from any animal or vegetable shortening. It is preferably a vegetable shortening, such as cottonseed oil, soybean oil, peanut oil, palm oil, corn oil, safflower oil, sunflower seed oil, canola oil and mixtures thereof. More preferably the vegetable shortening is made from partially hydrogenated cottonseed, soybean oil, and mixtures thereof. The present frosting compositions comprise about 1 to 5% of the present shortening, preferably about 2 to 4%, and more preferably about 3 to 4%.

Surprisingly, selecting a shortening component having a relatively high solid fat index ("SFI") allows reduction in the shortening component level while maintaining the desirable RTS frosting attribute. Such a reduction in concentration, while maintaining product attributes is important in the realization of the present reduced fat RTS frostings. The solid fat index is a measure of the amount of solids present at a given temperature based upon the total weight of the margarine oil. The SFI is a commonly used means of reporting the percentage of solid material in an oil or shortening, and is determined by dilatometry. By selecting a high shortening SFI, a stiffer, shorter consistency in the final product is created.

The high SFI shortening used in the present RTS frostings desirably has an approximate Solid Fat Index as shown in Table 1 below. Table 1 also compares a conventional shortening employed in a conventional full fat RTS frosting with the preferred present shortening. For example, at 50° F. (10° C.) the preferred shortening SFI is typically 46 to 52%, which represents a substantially higher solids content than conventional RTS shortening ingredients. Generally, the SFI of the present shortening is higher at all temperatures than the SFI of the conventional shortening used in full fat RTS frostings. As a result, the shortening used herein is relatively stiffer, more "plastic," and less flowable than conventional shortening, while nonetheless contributing less fat to the final product.

TABLE 1

| Temperature | Standard Shortening* SFI | Present Shortening SFI |
|---|---|---|
| 50° F. (10° C.) | 23.5–29.5% | 30–56% |
| 70° F. (21° C.) | 16–22% | 20–43% |
| 80° F. (27° C.) | 13.5–19.5% | 18–35% |
| 92° F. (33° C.) | 8.5–12.5% | 13–25% |
| 104° F. (40° C.) | 5–8% | 6.5–19% |

| Temperature | Preferred Shortening SFI | Most Preferred Shortening SFI |
|---|---|---|
| 50° F. (10° C.) | 40–56% | 46–52% |
| 70° F. (21° C.) | 30–43% | 33–39% |
| 80° F. (27° C.) | 24–35% | 27–32% |
| 92° F. (33° C.) | 15–25% | 17–22% |
| 104° F. (40° C.) | 7–19% | 8–12% |

*The standard shortening used for comparison purposes is available from Anderson Clayton/Hanko Products Co. under the trade name Super Bowl All Purpose Shortening.

In less preferred embodiments, the shortening component can be eliminated entirely. The products are not as creamy or smooth. Such products, however, do provide the advantage of being even lower in fat content.

Emulsifier Component

The present RTS frosting compositions essentially comprise relatively high levels of selected emulsifier(s) herein. Emulsifier(s) are used herein as a fat sparing additive to aid in 1) providing a shorter texture, more spreadable consistency, body, and 2) providing a creamy mouth feel. Emulsifiers also are employed herein to stabilize the water and fat components, provide freeze/thaw stability, provide the desired texture and mouth feel attributes in the present RTS frosting, increase the viscosity, and prevent icing breakdown due to moisture weeping. In addition to their effect on texture and mouth feel, emulsifiers also effectively aid in aerating the final product toward its target density of 0.95–1.20 g/cc.

All or part of the emulsifiers can be added directly to the frosting composition as convenient, or be preblended with the shortening component prior to addition to the frosting compositions.

Some emulsifier(s), e.g., monoglycerides, have relatively higher melting points than the shortening component. Consequently, as more emulsifier is added to the shortening to form an emulsified shortening, its melting point and hardness increases. The emulsified shortening is added to the other ingredients as a plastic solid as explained below. As the increased emulsifier levels "hardens" the shortening, blending with the other ingredients becomes more difficult. Thus, in preferred practice a first portion of the emulsifier is preblended with the shortening, a second portion can be added in its dry powder form while a third portion is admixed in liquid form.

The emulsifier in the emulsified shortening can be any of those listed above. Preferably it is a monoglyceride. The preferred monoglyceride emulsifier has an iodine value less than about 20, preferably less than about 15, and most preferably less than about 10. The monoglyceride emulsifier preferably is a mixture of monoglycerides of higher fatty acids.

The preferred emulsified shortening contains at least about 3% of a monoglyceride emulsifier, more preferably about 5 to 10% monoglyceride emulsifier, and most preferably about 7 to 8%. The preferred emulsified shortening oil also is made up of no more than about 97% partially hydrogenated triglycerides. More preferably the shortening contains about 90 to 95%, and most preferably about 92 to 93% triglycerides.

Emulsifiers useful in the frosting formulations of the present invention include the mono- and diglycerides of higher fatty acids such as stearic acid, the sorbitan esters of the higher fatty acids, the polyoxyethylene derivatives of sorbitan esters of higher fatty acids, polyglycerol esters ("PGE"), sucrose esters or mixtures thereof. The emulsifiers can include unmodified monoglycerides, ethoxylated monoglycerides, and polyethylene glycol esters of glyceryl stearate, for example. Phospholipids, such as lecithin, are also useful emulsifiers, as is the hydrated emulsifier disclosed in U.S. Pat. No. 3,671,459 issued to M. E. Norris, the polyol esters of alpha-hydroxy carboxylic acids disclosed in U.S. Pat. No. 4,363,763 and the emulsifiers disclosed in U.S. Pat. No. 4,310,557 which are mixtures of monoglycerides, propylene glycol monoesters, and alkali metal salts of fatty acids. Exemplary useful PGE's include triglycerol monostearate and decaglycerol dipalmitate.

In preferred embodiments the emulsifiers are preferably present as a mixture of high and low HLB (hydrophilic-lipophilic balance) components greatly richer in low HLB emulsifiers. This richer low HBB emulsifier blend is preferred for improved flavor and texture properties. The high and low HLB components are preferably present in a ratio of about 1:3–8, preferably about 1:5 (high to low). "High HLB" emulsifiers have an HLB value of about 11–20, whereas "low HLB" emulsifiers have an HLB value of no greater than about 10. The HLB value of particular emulsifier material is, of course, generally a known technical specification. Exemplary useful low HLB emulsifiers include unmodified monoglycerides, mono and diglyceride blends, triglycerol monostearate, sorbitan esters, propylene glycol fatty acid esters, and lecithin. Exemplary useful high HLB emulsifiers include ethoxylated monoglycerides, polysorbates, ethoxylated sorbitans, decaglycerol dipalmitate.

Even more preferred low HLB emulsifiers include monoglycerides with an HLB value of $<6$ and with an iodine value of $<15$; and as high HLB emulsifiers ethoxylated monoglycerides with an HLB value of $>11$ and with a hydroxy value between 65 and 80. These emulsifier blends can be added to the formulation directly, or in a variety of forms, such as in an emulsified shortening or as a powder.

Examples of commercially available preferred emulsifiers include POE(20)GMS-K available from Hodag Chemical Corp. which comprises an ethoxylated monoglyceride with an HLB of about 13. A commonly used emulsifier powder available as BEALITE 3550 from Beatreme Food Ingredients, Inc. can also be used. This is a spray dried emulsifier containing 31% mono- and diglycerides (of which the monoglycerides are about 40 to 44% of the mono/di mixture), 34% corn syrup solids, 15% vegetable shortening, 10% sugar, 5% sodium caseinate, 4% polysorbate 60, and 1% sodium stearate.

The total amount of emulsifier(s) in the compositions of the present invention is adjusted such that suitable organoleptic properties are obtained. That is, the total level of emulsifiers is adjusted such that the reduced fat RTS frostings have a creamy, rich mouth feel, a smooth texture, a short consistency, spreadability without flowing or running, and a density of about 0.95–1.2 g/cc. The present reduced fat RTS frosting compositions preferably comprise about 0.5 to 3.0% of the emulsifier(s). For better results, the emulsifier(s) comprises about 1 to 2%.

The distribution of total fat, in the form of a weight ratio of triglycerides to total emulsifiers present in the present frosting compositions desirably ranges from about 1:0.30–0.50, preferably about 1:0.35–0.45, and more preferably 1:0.38–0.45. Such triglyceride/emulsifier fat distribution ratio represents roughly an increase of three to four times in the emulsifier content relative to the amount of triglyceride commonly found in most conventional ready-to-spread frostings.

Gelling Agents

Still another essential ingredient in the present reduced fat frostings herein are selected, high gel strength gelling agent(s), such as particular specific hydrophilic colloids, i.e., hydrocolloids, and colloidal polysaccharide systems. Indeed, employment of a gelling agent in combination with the other ingredient selection (especially the high SFI shortening) and concentration is the most important compensation for the lack of shortening herein. The materials referred to herein as "gelling agents" are those that associate and form strong colloidal gels, i.e., a relatively solid form as is characterized by a gelatin dessert. This can include, but is not limited to, materials often referred to as a "gelatin," "polysaccharide gum," "modified starch," and "modified cellulose." The skilled artisan will appreciate that the present gelling agent is not a mere thickener and that not all materials known for use as thickeners can be used herein. Moreover, not even all known gelling agent materials or grades can be used herein but only high strength gelling agents.

The high strength gel-forming hydrocolloids useful herein can be both "natural" (e.g., agar, algin, or carrageenan) and "modified" polysaccharide gums (e.g., low methoxyl pectins, or "starch" additives). Examples of effective high strength gelling agents include, but are not limited to, hydrocolloids such as: agar or agar-agar, i.e., a polysaccharide complex extracted from certain marine red algae; algin, i.e., a polysaccharide extracted from giant brown seaweed; carrageenan, i.e., a complex mixture of sulfated polysaccharides extracted from red seaweed, such as kappa and iota carrageenan; modified celluloses; modified starches; low methoxyl pectins; and selected proteins such as gelatin.

Effective gel-forming hydrocolloids can be characterized according to the strength of the gel they are capable of forming. This can be done using a variety of methods and reported using a variety of scales. For example, certain of the effective gel-forming hydrocolloids useful in the present invention have an interior gel strength of at least about 50 g, and preferably at least about 110 g, at about 40° F. (4.4° C.), as measured by a Marine Colloids Curd Tension Meter. Certain other gel-forming agents for which bloom strength (i.e., rigidity) is conventionally given as the parameter of gel strength, such as gelatins, have a bloom strength of at least about 100, and preferably at least about 200, at 50° F. (10° C.). Finally, for those hydrocolloids for which the Voland Stevens method, as described in U.S. Pat. No. 4,761,292 issued to M. E. Augustine et al., is used to measure gel strength, the gel strength is preferably at least about 50 grams, and more preferably at least about 90 grams, at room temperature.

The agar useful in the present invention preferably has an interior gel strength of at least 40–170 g, more preferably about 110–150 g, at about 40° F. (4° C.), using a Marine Colloids Curd Tension Meter. This is a measure of the steady force needed to cut through the center of the gelled material. The typical process by which this is measured is as follows: 2.56 grams of agar is added to 194 grams of 125° F. (52° C.) deionized water with stirring for 1.5 minutes; a drop of a silicone defoaming agent such as Dow Corning ANTIFOAM C is then added with stirring until the foam disappears; the mixture is then placed in a 40° F. (4° C.) refrigerated bath for 18–24 hours, at which time the gel strength is measured.

Agar-agar, surprisingly, among other gel forming agents otherwise thought to be equivalent is particularly advantageous for use in the present invention because frosting compositions that contain agar exhibit particularly superior aeration properties in addition to the primary benefit of creating a short, plastic texture with a minimum of fat and retaining this property for over a year of shelf life relative to compositions containing other gelling agents. Furthermore, agar surprisingly herein also contributes to the simulation of a more creamy, fat-like mouth feel, relative to other gelling agents. When other gelling hydrocolloids are employed in substitution for agar, higher concentration of the present emulsifiers are also desirably employed to compensate for their lesser aeration properties.

Gel-forming proteins, such as gelatin, that are particularly useful in the present invention typically have a bloom strength, of at least about 200, which is representative of a moderate to high strength gel-forming material. The low methoxyl pectins useful in the present invention typically have a degree of methoxylation of about 20–50. An example of such a product is the Hercules Inc. product "104A," which has a degree of methoxylation of about 27–33. Such pectins form gels in the presence of divalent cations such as calcium. Gel strength can be increased by increasing the calcium concentration.

Cellulose-based gelling agents useful in the present invention include, but are not limited to, hydroxypropyl cellulose, microcrystalline cellulose, and sodium carboxymethylcellulose. A preferred cellulose-based gelling agent is a water-insoluble, cold-water swelling, microcrystalline cellulose. A particular example is marketed as AVICEL, which is a mixture of microcrystalline cellulose and sodium carboxymethylcellulose, available from Food and Pharmaceutical Products Division of FMC Corporation, Philadelphia, PA.

Other polysaccharide systems, such as modified starches, are also useful in the present invention because of their ability to form gels. They are particularly effective at compensating texturally for the lack of shortening in the reduced fat RTS frosting compositions. Useful starches can be selected from any of a wide variety of commercially available products including, but not limited to, barley, corn, potato, wheat, rice, waxy maize, sorghum, arrowroot, tapioca, or mixtures thereof.

Starch is a mixture of linear (amylose) and branched (amylopectin) polymers of alpha-D-glucopyranosyl units, which can be subjected to chemical modification to alter some of the native characteristics, e.g., viscosity, gel strength, etc. Starch granules contain an elutable amylose fraction and a branched amylopectin fraction. When starch granules are contacted with water and heated above a temperature designated as the gel point, the granules begin to bind water and swell. The gel temperature for a particular starch variety depends on a number of factors, including particle size, pH, and absolute concentration. Particularly advantageous starches are those classified as cold-water-swelling starches which includes pregelatinized starches.

Pregelatinized starches are useful, at least in part, because of their reduced contributions to flavor and mouth feel in the final product. A wide variety of commercially available pregelatinized starches can be used in the formulations of the present invention. The choice of the particular pregelatinized starch chosen depends on the desired texture and mouth feel of the final product. A preferred pregelatinized starch is available from National Starch Co. under the trade name Instant Clearjel.

Exemplary useful cold-water-swelling starches are those that have been subjected to an alcohol process, as described in U.S. Pat. No. 4,465,702 or further modified by substitution, cross-linking or oxidation. Useful cold water swelling starches are characterized by a solubility in cold water of greater than about 50%, and a fat content of less than about 0.25%. These starches are particularly preferred in the reduced fat RTS frostings, at least in part, because they do not require a heat treatment to develop their functionality such as increase in viscosity, gel-forming ability, etc. and also provide smoother textured gels than pregelatinized starches.

Preferably the cold-water-swelling starches have a gel forming capability represented by a gel strength of greater than about 90 grams, as measured by the Voland Stevens method, at room temperature. Preferred examples of such starches include MIRA-GEL 463, Soft Set and MIRA-THIK 468 and 469 which are available from A. E. Staley Co., Inc. MIRA-GEL 463 is a corn starch that sets to a gel and provides body to the frosting. MIRA-THIK 469 is a corn starch substituted with propylene oxide and crosslinked with phosphorus oxychloride.

Other gelling systems usable in the present formulations include a gel forming mixture of 25 to 75% xanthan gum in combination with 25 to 75% locust bean gum, each of which are typically classified as non-gelling thickeners if used alone, but form a gel when used as a mixture due to synergism.

Preferred gelling agents are selected from the group consisting of agar, gelatin, low methoxyl pectin, carrageenan, cold water swelling starch, pregelatinized starch, microcrystalline cellulose and mixtures thereof. Agar is the gelling agent of choice herein.

The total level of gelling agent or agents in the compositions of the present invention is adjusted such that suitable organoleptic properties are obtained. That is, the total level of gelling agents is adjusted such that the reduced fat RTS frostings have a creamy, rich mouth feel, a smooth texture, a short consistency, spreadability without flowing or running, and a density of about 0.95–1.20 g/cc. The gelling agent or agents are preferably present in an amount of about 0.1 to 1.0%, more preferably about 0.2 to 0.9%, and most preferably about 0.3 to 0.8%.

The use of gelling agents (and especially the use of high gel strength gelling agents) in a high solids frosting composition to form a "spreadable" composition is surprising. This use is surprising because, at least in part, gelling agents upon the formation of a gel are not spreadable, i.e., the gelled compositions cannot be readily spread onto a substrate using a knife, or the like. Typically, a non-gelling thickener, such as xanthan gum, is used to impart spreadability to high solids frostings. In the context of the present compositions, however, thickeners such as non-gelling viscous gums make the frosting long and sticky. Indeed, in more preferred embodiments, the present frostings are substantially free (<0.5%) of conventional thickeners. Gelling agents that form gels, however, have been found to impart an unexpectedly desirable short, creamy consistency to the reduced fat RTS frostings. Such a short, creamy consistency has previously only been available in higher fat RTS frostings.

Moisture Content

The present low fat frosting compositions further essentially comprise an elevated water content. The water content in the present reduced fat RTS frostings is increased by about 1 to 4% over standard formulations. Standard RTS frostings can range in moisture widely but more typically for commercial RTS frostings are about 7 to 21%. The water content of the present reduced fat RTS frosting compositions essentially ranges from about 8 to 25%, preferably about 10.5 to 23%, and more preferably about 13.5 to 19.5%. The water can be added separately or as part of other frosting components, such as from corn syrup. Conventional potable water, preferably distilled water, which is substantially free of objectionable taste, colors, odors, and of approved bacteriological quality, is used.

The moisture content generally has an influence on the frosting's viscosity. Too much water produces a frosting that is too runny or has a pudding like consistency. Too little water produces a frosting that is too thick and difficult to spread. The viscosity of the reduced fat RTS frostings generally ranges from about 15–90, preferably about 25–60, (direct viscometer readings on product transferred to a 211 cc cup) at ambient temperature, i.e., 70° F. (21° C.), as measured by a Brookfield Model RVT viscometer with a heliopath stand at 20 revolutions per minute using a T-F spindle.

The increased water levels herein provide improved RTS frostings having significantly improved functional characteristics compared to conventional RTS frostings. For example, the present RTS frostings demonstrate a more rapid clearing from the mouth, which simulates the melting of fat in a full fat creamy RTS frosting. In essential combination, the type and amount of gelling agent(s), low levels of high SFI shortening and high levels of particular emulsifier combination permit a higher water level in the frostings of the present invention while maintaining a desirable consistency.

Optional Additives

The present reduced fat RTS frosting compositions optionally can additionally comprise a variety of adjuvant materials to modify the nutritional, organoleptic, flavor, color or other properties. In particular, the reduced fat RTS frosting formulation can additionally include fat replacers e.g., sucrose polyesters or hydrated colloidal protein dispersions (such as SIMPLESSE fat replacer, which is available from he NutraSweet Company). The present frostings can optionally further include sugar replacers or bulking agents, such as polydextrose, low DE maltodextrins, or specially modified starches. Purified polydextrose, which can be used to replace both sugar and fat, is disclosed in U.S. Pat. No. 4,622,233. If present, such fat or sugar substitutes can each comprise about 0.1 to 15% of the present compositions, preferably less than about 12%.

Additionally, synthetic and natural flavorings or coloring agents can be used in the frosting formulations of the present invention. These materials are generally not subject to the fat and egg white incompatibilities encountered with certain conventional low fat formulations. Exemplary flavors include cream or cream cheese flavor, milk powder, chocolate; vanilla extract; vanilla powder; cocoa substitute; hazelnut; dutched cocoa; mint; lemon and mixtures thereof. Also, flavor materials and particulates, such as fruit and fruit extracts, nuts, chips, and the like, can be added to the frosting compositions as desired. The flavoring agents are preferably used in amounts of about 0.01 to 3%. The coloring agents are preferably used in amounts of about 0.01 to 0.05%.

Other additives can be present in the reduced fat RTS frosting formulations in minor amounts, i.e., less than about 1%, preferably less than about 0.5%, if desired. They include, for example: salt; whiteners, such as titanium dioxide, etc.; mold inhibitors, such as potassium sorbate, sorbic acid, dehydroacetic acid, sodium benzoate, etc.; sequestering agents; acidulants; buffers; food acids; preservatives; antioxidants, such as butylated hydroxytoluene, butylated hydroxyanisole, etc.; vitamins; minerals; and the like.

Sequestering agents are often used to control the concentration of radical species (e.g., $Cu^{++}$, $Fe^{++}$), which can have a deleterious effect on the color. A common sequestering agent is an alkali metal pyrophosphate, such as sodium acid pyrophosphate ("SAPP") buffer (pH=5.3-5.7). The sequestering agents are preferably used in amounts of about 0.04 to 0.4%.

Acidulants, such as citric, acetic, and phosphoric acids can also provide pH control, and function in other capacities as well. For example, citric acid can be used for pH control, to activate potassium sorbate for mold control, to counter the alkalinity of cocoa used in a chocolate formulation, and to impart a tart flavor to the frosting. The acidulants are preferably used in amounts of about 0 to 2.5%.

Processing

The frosting formulations are prepared by first mixing or blending together in any order the sweetening agents, water, gelling agents, shortening, emulsifiers, and other additives in such a manner as to achieve a uniform blend and to minimize final texture development, i.e., gelation of the gelling agent, until the product is packaged.

Preferably, the gelling agent and water are initially combined to form a dispersion. The water can be at room temperature, but it is preferably at a temperature of about 120°-200° F. (49°-93° C.). Thereafter, the aqueous gelling agent dispersion, any liquid sweetening agents such as corn syrup, and any liquid or dry minor ingredients, i.e., those present in an amount less than about 1%, are combined with mild agitation until a relatively uniform blend is achieved. Any dry emulsifier used, such as an emulsifier powder, is then added along with the dry sweetening agents, and any cocoa used. Finally, the shortening is added with more agitation which also serves to aerate the composition to the densities herein. The mixture is then homogenized until it is thoroughly dispersed and a relatively uniform blend is achieved. The composition then is cooled to remove heat added from homogenization prior to packaging.

In even more preferred embodiments, processing conditions are utilized to retain maximum functionality of the material during production runs. Specifically, the production process is conducted such that blending and packaging result in minimal disruption of the gelling system. Gelation of the gelling agent is a function of temperature primarily and secondarily of time. After initial blending with water, shear is not unduly detrimental, but shear becomes progressively undesirable as gel development progresses. Also, the entire holding time for the composition from the initial mixing step until the final packaging step is less than about 5-8 hours.

Processing temperature control requires balancing competing considerations. On the one hand, higher temperatures forestall premature gelation allowing mixing and the inevitable concomitant shear. On the other hand, high temperatures cause the shortenings solids to melt thereby undesirably altering the fat crystal distribution and loss of the desirable frosting attributes contributed by the frosting.

For a desirable, short, creamy consistency the temperatures throughout the processing steps are maintained at about 90°-109° F. (32°-43° C.), more preferably about 95°-105° F. (35°-41° C.). If the processing causes excessive temperature, e.g., homogenization, then the product can be cooled as necessary to maintain desirable processing temperatures.

The present RTS frostings are essentially aerated from a native density of about 1.3 g/cc so as to provide finished products importantly characterized by a density essentially ranging from about 0.95 to 1.20 g/cc, preferably about 1.09 to 1.13 g/cc. Aeration is practiced at about 95°-105° F. (35°-41° C.). Any conventional method can be used. For example, the gas can be forced through small orifices into the composition as the composition flows through a tube or vessel into a mixing chamber, where uniform distribution occurs. Any conventional nontoxic, odorless, tasteless propellant, such as air, nitrogen, nitrous oxide, carbon dioxide, and mixtures thereof can be used. The final product is then packaged in suitable containers, e.g., clean, air tight containers, e.g., plastic tubs, immediately thereafter at a temperature of about 95°-105° F. (35°-41° C.).

Most surprisingly, the present frosting compositions are storage stable in a sealed container for up to about one year under ambient conditions and still maintaining its desirable spreadable consistency and without syneresis, i.e., a water layer forming, and without losing the smooth uniform consistency. Furthermore, the reduced fat RTS frosting compositions are oxidatively stable against spoilage or other degradation without refrigeration.

Industrial Applicability

The present frosting compositions are particularly suitable for use in the packaged foods industry for both the grocery retail trade to consumers and the institutional and food service markets.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the RTS frosting art, can be undertaken without departing from the spirit and scope of the invention.

EXAMPLE

Low fat vanilla and chocolate RTS frostings of the present invention were prepared having the following formulations. Both of these products are 94% fat free, have at least a 70% reduction in fat from standard full-fat creamy-type RTS frostings, and have at least a 10% reduction in calories as compared to full-fat creamy-type RTS frostings.

TABLE 2

| Ingredient | Vanilla Reduced Fat RTS Frosting (wt. %) | Chocolate Reduced Fat RTS Frosting (wt. %) |
|---|---|---|
| 12x Powdered Sucrose | 71.85 | 67.58 |
| Water | 14.25 | 17.50 |
| 42 DE Corn Syrup | 5.00 | 2.50 |
| Emulsified Shortening[1] | 3.75 | 3.33 |
| Emulsifier[2] | 3.00 | 3.00 |
| Emulsifier[3] | 0.20 | 0.20 |
| Cold Water Swelling Starch[4] | 0.42 | — |
| Agar | 0.33 | 0.33 |
| Dutched Cocoa | — | 5.00 |
| Vanilla Flavor | 0.63 | — |
| Titanium Dioxide | 0.20 | — |
| Potassium Sorbate | 0.13 | 0.13 |
| Salt | 0.10 | 0.25 |
| Buffer | 0.10 | 0.10 |
| Yellow Color | 0.04 | — |
| Citric Acid | — | 0.08 |
| Total Fat Content | 5.50 | 5.60 |
| Calories/gram | 3.50 | 3.50 |

[1]Containing about 7% monoglyceride emulsifier
[2]An emulsifier in powder form comprising a blend of mono and diglycerides and available from Beatreme Food Ingredients under the trade name Bealite 3550.
[3]An emulsifier in liquid form comprising a blend of ethoxylated monoglycerides and available from Hodag Chemical Corp. under the trade name POE(20)GMS-K.
[4]A cold water swelling starch available from A. E. Staley under the trade name Mira-Gel 463.

The frosting formulations listed above were prepared by initially mixing the agar gelling agent, and water (at a temperature of approximately 185° F., i.e., 85° C.) to form a dispersion. Thereafter, the corn syrup and ethoxylated monoglyceride emulsifier was added to this dispersion, along with any liquid or dry minor ingredients, i.e., those present in an amount less than about 1%. For the chocolate frosting this included the potassium sorbate, salt, and citric acid. For the vanilla frosting this included the vanilla flavor, titanium dioxide, potassium sorbate, salt, buffer, and yellow color. The mixture was then subjected to mild agitation until a relatively uniform blend was achieved. The emulsifier powder, Mira-Gel 463 starch for vanilla, sucrose, i.e., 12x ground sucrose, were then added to the mixture. For the chocolate frosting, the dutched cocoa was also added to the mixture. Finally, the emulsified shortening was added and the mixture was agitated. During this mixing process, which was conducted at a temperature of about 99° F. (37° C.), air was forced through the mixture for aeration. The mixture was then homogenized until it was thoroughly dispersed and a relatively uniform blend was achieved. Finally, the blended composition was cooled to about 99° F. (37° C.) and packaged. The density is about 1.13 g/cc.

The chocolate RTS frosting has a total fat content of about 5.6%. While the vanilla frosting has a fat content of about 5.5%. The caloric value for each frosting is about 3.5 cal/g. The fat distribution ratio is about 1:0.40 triglyceride to emulsifier for the chocolate and about 1:0.35 for the vanilla. The emulsifier had a high HLB to low HLB ratio of about 1:5. The SFI profile for the shortening is given in Table 1 above as the preferred.

What is claimed is:

1. A reduced fat ready-to-spread frosting composition which nonetheless exhibits a spreadable consistency for an extended shelf life, comprising:
   A. about 50 to 85 wt % of a sweetening agent;
   B. about 1 to less than 5 wt % of a triglyceridic shortening;
   C. about 0.5 to 3 wt % of an emulsifier component, wherein the weight ratio of triglyceride to emulsifier components is about 1:0.3 to 0.5;
   D. about 0.1 to 1.0 wt % of a gelling agent; and,
   E. about 8 to 25 wt % moisture,
wherein the frosting composition contains less than about 6% total fat, and has a density of about 0.95 to 1.20 g/cc and less than about 4 calories per gram.

2. The reduced fat ready-to-spread frosting composition of claim 1 wherein the weight ratio of triglyceride to emulsifier components is about 1:0.35 to 0.45.

3. The reduced fat ready-to-spread frosting composition of claim 2 wherein the shortening has a Solid Fat Index of:

| Temperature (°F.) | Solid-Fat Index (wt %) |
|---|---|
| 50 | 30–56 |
| 70 | 20–43 |
| 80 | 18–35 |
| 92 | 13–25 |
| 104 | 6.5–19 |

4. The reduced fat ready-to-spread frosting composition of claim 3 wherein the shortening has a Solid Fat Index of:

| Temperature (°F.) | Solid-Fat Index (wt %) |
|---|---|
| 50 | 40–56 |
| 70 | 30–43 |
| 80 | 24–35 |
| 92 | 15–25 |
| 104 | 7.5–19 |

5. The reduced fat ready-to-spread frosting composition of claim 4 wherein the shortening has a Solid Fat Index of:

| Temperature (°F.) | Solid-Fat Index (wt %) |
|---|---|
| 50 | 46–52 |
| 70 | 33–39 |

-continued

| Temperature (°F.) | Solid-Fat Index (wt %) |
|---|---|
| 80 | 27-32 |
| 92 | 17-22 |
| 104 | 8-12 |

6. The reduced fat ready-to-spread frosting composition of claim 5 wherein the shortening contains about 1 to 2% of a food-grade emulsifier by weight of the shortening.

7. The reduced fat ready-to-spread frosting composition of claim 6 wherein the gelling agent is selected from the group consisting of agar, gelatin, cold water swelling starch, pregelatinized starch, microcrystalline cellulose, low methoxyl pectin, kappa and iota carrageenan and mixtures thereof.

8. The reduced fat ready-to-spread frosting composition of claim 7 wherein the gelling agent is a mixture of agar and a pregelatinized or cold water swelling starch.

9. The reduced fat ready-to-spread frosting composition of claim 8 wherein the emulsifier component comprises a combination of high and low HLB emulsifiers in a ratio of about 1:3 to 8.

10. The reduced fat ready-to-spread frosting composition of claim 9 wherein the emulsifier component additionally comprises a powdered emulsifier.

11. The reduced fat ready-to-spread frosting composition of claim 10 wherein the sweetening agent comprises sucrose and corn syrup and wherein the emulsified component comprises a monoglyceride having an iodine value less than about 20.

12. The reduced fat ready-to-spread frosting composition of claim 11 wherein the emulsifier is selected from the group consisting of mono and diglycerides, ethoxylated monoglycerides, polyglycerol esters, sucrose esters, polysorbates, lecithin and mixtures thereof.

13. A reduced fat ready-to-spread frosting composition which nonetheless exhibits a spreadable consistency for an extended shelf life, comprising:
   A. about 70 to 80 wt % of
      1. a sweetening component including about 65 to 75 wt % sucrose, and
      2. about 2 to 5 wt % corn syrup;
   B. about 2 to less than 5 wt % of the composition of an emulsified triglyceride shortening including at least about 5 wt % of a first emulsifier, based upon the total weight of the shortening;
   C. about 0.1 to 1.0 wt % of a gelling agent;
   D. a second emulsifier in an amount such that the total amount of triglycerides to emulsifiers in the frosting composition is about 1:0.30 to 0.50; and,
   E. a moisture content ranging from about 7 to 25%, wherein the frosting composition contains less than about 6% total fat, less than about 4 calories per gram, and has a density of about 1.09 to 1.20 g/cc.

14. The reduced fat ready-to-spread frosting composition of claim 13 wherein the frosting composition contains less than about 4% shortening.

15. The frosting composition of claim 14 wherein the first and second emulsifiers comprise unmodified monoglyceride, unmodified diglyceride, ethoxylated monoglyceride, ethoxylated diglyceride, and mixtures thereof.

16. The reduced fat ready-to-spread frosting composition of claim 15 wherein the weight ratio of triglycerides to emulsifiers is about 1:0.35 to 0.45.

17. The reduced fat ready-to-spread frosting composition of claim 14 wherein the emulsifier is selected from the group consisting of mono and diglycerides, ethoxylated monoglycerides, polyglycerol esters, sucrose esters, polysorbates, lecithin and mixtures thereof.

18. A reduced fat, no shortening ready-to-spread frosting composition which nonetheless exhibits a spreadable consistency for an extended shelf life consisting essentially of:
   A. about 50 to 80 wt % of a sweetening agent by weight of the composition;
   B. about 0.1 to 1.0 wt % of a hydrocolloid gelling agent;
   C. about 0.5 to 3 wt % of an emulsifier component including a monoglyceride emulsifier with an iodine value of less than about 15;
   D. a moisture content ranging from about 7 to 25 wt, wherein the frosting composition contains less than about 4% fat and has a density of about 0.95 to 1.20 g/cc.

19. The reduced fat ready-to-spread frosting composition of claim 18 including a water content of about 10.5 to 23 wt %,-based upon the total weight of the frosting composition.

20. The reduced fat ready-to-spread frosting composition of claim 19 wherein the frosting composition has less than 3.8 calories per gram.

21. The reduced fat ready-to-spread frosting composition of claim 20 wherein the emulsifier is selected from the group consisting of mono and diglycerides, ethoxylated monoglycerides, polyglycerol esters, sucrose esters, polysorbates, lecithin and mixtures thereof.

* * * * *